A. HUETTER.
AIR BAG FOR VEHICLE TIRES.
APPLICATION FILED APR. 19, 1920.

1,374,570. Patented Apr. 12, 1921.

Inventor
Andrew Huetter
By: J. L. Walker
Attorney

UNITED STATES PATENT OFFICE.

ANDREW HUETTER, OF DAYTON, OHIO, ASSIGNOR TO THE ALLSTEEL RIDEWELL TIRE AND RUBBER COMPANY, OF DAYTON, OHIO, A CORPORATION OF OHIO.

AIR-BAG FOR VEHICLE-TIRES.

1,374,570.          Specification of Letters Patent.          Patented Apr. 12, 1921.

Application filed April 19, 1920. Serial No. 374,983.

*To all whom it may concern:*

Be it known that I, ANDREW HUETTER, a former subject of the Emperor of Austria, residing at Dayton, in the county of Montgomery and State of Ohio, have invented certain new and useful Improvements in Air-Bags for Vehicle-Tires, of which the following is a specification.

This invention relates to molds for plastic materials and more particularly to an expansible or inflatable core or air bag for use in the manufacture and repair of vehicle tires.

The object of the invention is to simplify the structure as well as the means and mode of operation of such devices whereby they will not only be cheapened in construction, but will be more efficient in use, positive in operation, uniform in action, and unlikely to get out of repair.

A further object of the invention is to provide a pliable air bag having therein an annular stay or reinforcement for the excess material by which the expansion or deflection of the core or bag is compensated.

A further object of the invention is to provide a pliable air bag having thereon beads or surface configurations which will give to the edges of the casing a more desirable and finished outline.

A further object of the invention is to provide in such a pliable core or air bag, a compensating fold of material intermediate the bead or edges of the tire casing, which will compensate for the expansion or distention of the air bag.

With the above primary and other incidental objects in view as will more fully appear in the specification, the invention consists of the features of construction, the parts and combinations thereof, and the mode of operation or their equivalents as hereinafter described and set forth in the claims.

Figure 1:
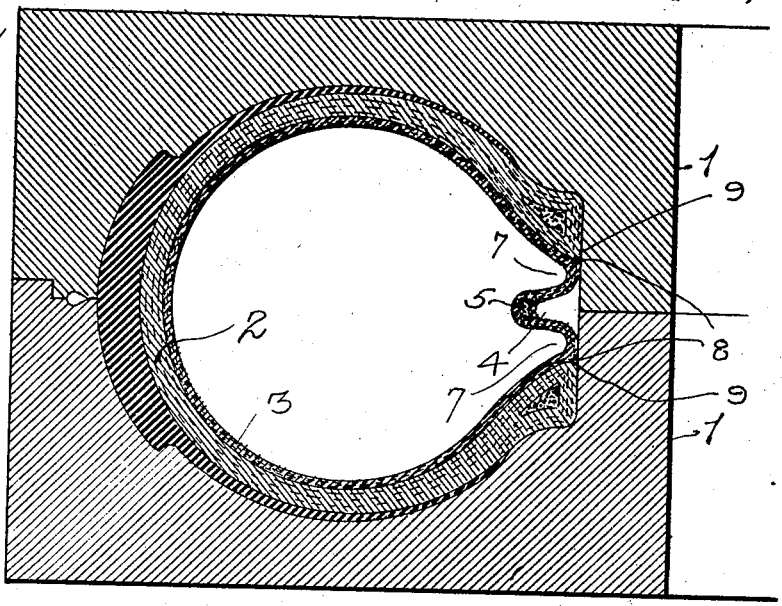
Figure 2:
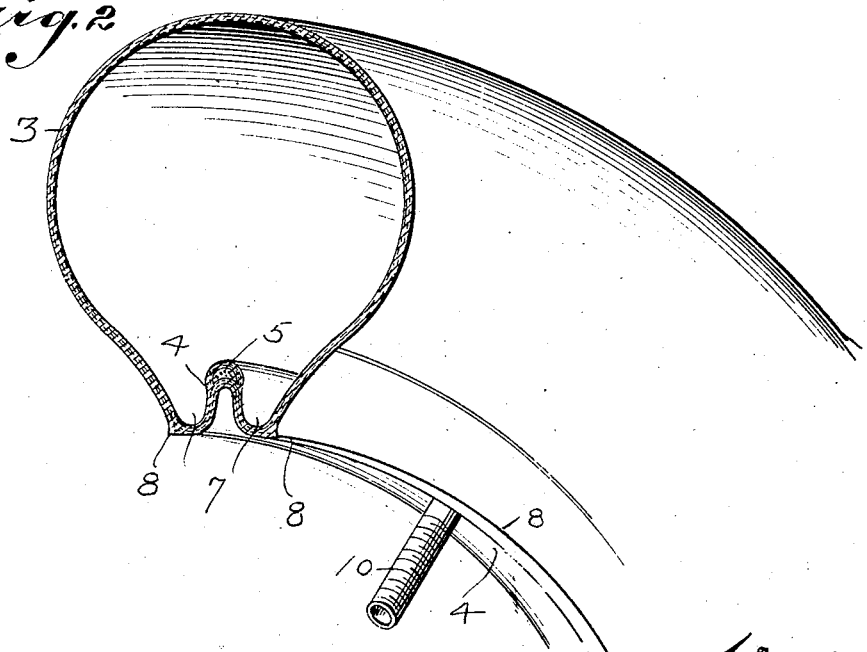

In the preferred form of embodiment of the invention disclosed in the accompanying drawings, Figure 1 is a transverse sectional view of a tire mold or matrix, containing a tire casing within which the expansible core or air bag forming the subject matter hereof, is located. Fig. 2 is a detail sectional perspective view of a portion of the air bag or core removed from the tire.

Like parts are indicated by similar characters of reference throughout the several views.

Referring to the drawings, 1—1 are the respective halves of the tire mold or matrix which determines the exterior shape and configuration of the finished product. The tire casing formed therein is indicated at 2, which tire casing during process of manufacture is subjected to internal pressure by means of an inflatable or expansible core or air bag 3. This inflatable air bag 3 is formed of pliable yielding material, namely rubberized fabric. The core or air bag is formed into a hollow or tubular annulus, the transverse or sectional periphery of which is equal to or somewhat greater than the cross-sectional interior contour of the casing or tire. Pliable air bags for this purpose have been commonly used, heretofore. However, in such use the excess material of the bag necessary to allow the bag its full expansion into conformity with the tire may not always occur at the beaded or open side of the casing, but upon inflation this excess material may be distributed variously throughout the bag in the form of wrinkles or uneven pressure surfaces. In the present instance this excess material or compensating fold is concentrated upon the inner side of the core bag at a point between the beaded edges of the tire casing. To this end the tubular core bag has been formed with a reentering fold 4, coincident with the inner circumference of the core bag. At the inner edge or apex of this fold 4 there is provided a reinforcement band 5. The reinforcement band 5 may be of any suitable character such as a series of strands of cord or a thickening of the side wall of the core bag by an increased number of ply or folds of material. Likewise it may be an independent strip of different material, secured to the apex or edge of the bellows like fold. This reinforcement band is continuous throughout the annular core bag and possesses less elasticity than the side walls thereof, the reinforcement band 5 being of greater diameter than the interior circumference of the tire and core bag serves to maintain the reëntrant form of the bellows fold or core, of surplus material. The diameter of this reinforcing band or strip bears such relation to the interior diameter of the tire casing and the core bag, that the walls of the core bag fall into two parallel circumferential bights or folds 7 on each side of the reinforcement band.

Formed upon the exterior surface of the walls of the core bag co-incident with the parallel bights or folds 7 are shoulder-like beads or ribs 8, formed by a thickening of the walls of the core bag at these points. These shoulders or beads give definition to the inner edges of the tire casing, by forming a rounded or abrupt edge 9, whereas the ordinary form of core bag allows the formation of a feather edge or fin at this point. The walls of the core bag preferably though not necessarily possess some degree of elasticity. They are, however, preferably quite pliable whereby they will readily accommodate themselves to the interior contour of the tire. The core or air bag is distended to subject the tire casing within the matrix to pressure by being inflated by fluid pressure admitted through the inlet valve 10. Any suitable fluid under pressure may be employed for distending or inflating the core or air bag, however, air pressure is ordinarily employed for this purpose.

From the above description it will be apparent that there is thus provided a device of the character described possessing the particular features of advantage before enumerated as desirable, but which obviously is susceptible of modification in its form, proportion, detail construction and arrangement of parts without departing from the principle involved or sacrificing any of its advantages.

While in order to comply with the statute, the invention, has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. In an inflatable core for tires, a pliable tubular annulus having a reëntrant circumferential fold in the inner circumference thereof, and an inelastic reinforcement band at the apex of said fold, said band being of greater circumference than the inner circumference of the tire to which the core is to be applied.

2. In an inflatable core for tires, a pliable tubular annulus having a reëntrant inner circumferential fold and supporting means for said fold substantially as specified.

3. In an inflatable core for tires, a pliable tubular annulus having a reëntrant inner circumferential fold, the inner edge of said fold being reinforced, substantially as specified.

4. In an inflatable core for tires, a pliable tubular annulus having a reëntrant inner circumferential fold, and an annular reinforcement for said fold having a diameter intermediate the internal and external diameters of the core when distended.

5. In an inflatable core for tires, a pliable tubular annulus having a reëntrant inner circumferential fold, and two parallel integral beads formed on the exterior surface of the annulus on opposite sides of said fold.

6. In an inflatable core for tires, a pliant tubular annulus having an inner circumference greater than the inner circumference of the tire to which it is to be fitted, and an excess of material on each side of the inner circumferential line, said excess material falling in two flexible folds or bights on opposite sides of the inner circumferential line substantially as specified.

7. In a tire core, a pliant tubular annulus, two parallel oppositely disposed annular shoulders on the inner surface of said annulus and an expansible section intermediate said shoulders.

8. In a tire core, a pliant tubular annulus of fabric having a reëntrant inner circumferential fold, and means for applying internal pressure to said core.

9. In a tire core, a tubular annulus, two parallel shoulder beads upon the inner circumference of the annulus, and means for applying internal pressure to the core, said shoulder beads being laterally movable in relation one with the other under the influence of the internal pressure.

10. In a tire core, a tubular annulus, two abrupt oppositely disposed shoulder beads on the inner circumference of the annulus coinciding with the bead edges of the tire to be mounted on said core, said shoulder beads being relatively separable by the application of internal pressure to the core.

11. In a tire core, a tubular annulus, two parallel shoulder beads upon the inner circumference of the annulus, a bellows fold in said tubular annulus intermediate said shoulders and means applying internal pressure to the core.

12. In a tire core, a tubular annulus, two parallel shoulder beads upon the inner circumference of the annulus, an expansible area between said shoulders, and means for applying internal pressure to the core.

In testimony whereof, I have hereunto set my hand this 16th day of April A. D., 1920.

ANDREW HUETTER.

Witnesses:
E. E. DUNCAN,
G. C. HELWIG.